(12) United States Patent
MacKinnon et al.

(10) Patent No.: US 8,966,870 B2
(45) Date of Patent: Mar. 3, 2015

(54) METHODS OF CONTROLLING A LAWN MOWER HAVING ELECTRIC DRIVE AND BLADE MOTORS

(71) Applicant: Accelerated Systems Inc., Kitchener (CA)

(72) Inventors: Stuart Craig MacKinnon, Waterloo (CA); Robert Gordon Lankin, St. Agatha (CA); Jason Cornelius Wiseman, Guelph (CA); Christopher Keith Derbecker, Brantford (CA)

(73) Assignee: Accelerated Systems Inc., Waterloo (CA)

( * ) Notice: Subject to any disclaimer, the term of this patent is extended or adjusted under 35 U.S.C. 154(b) by 93 days.

(21) Appl. No.: 13/657,308

(22) Filed: Oct. 22, 2012

(65) Prior Publication Data

US 2013/0104509 A1 May 2, 2013

Related U.S. Application Data

(60) Provisional application No. 61/551,895, filed on Oct. 26, 2011.

(51) Int. Cl.
*A01D 69/00* (2006.01)
*A01D 34/78* (2006.01)

(52) U.S. Cl.
CPC .............. *A01D 34/78* (2013.01); *B60L 2200/40* (2013.01)
USPC ...................................... 56/10.2 R

(58) Field of Classification Search
USPC ...... 56/10.2 R, 10.5, 11.1, 13.5, 11.9, 10.2 G, 56/16.7, 10.8, 17.1
See application file for complete search history.

(56) References Cited

U.S. PATENT DOCUMENTS

| | | | |
|---|---|---|---|
| 3,809,975 | A | 5/1974 | Bartels |
| 4,070,671 | A | 1/1978 | Morrow |
| 4,630,701 | A | 12/1986 | Venetjoki |
| 4,656,559 | A | 4/1987 | Fathi |
| D296,323 | S | 6/1988 | McCarthy |
| 4,790,399 | A | 12/1988 | Middlesworth |
| 4,807,904 | A | 2/1989 | Kamlukin et al. |
| 4,845,590 | A | 7/1989 | Mikolajczak |
| 4,865,146 | A | 9/1989 | Ohe |
| 4,886,291 | A | 12/1989 | Okamoto |
| 5,032,996 | A | 7/1991 | Shiraishi |
| 5,099,714 | A | 3/1992 | Hutchison et al. |
| 5,194,851 | A | 3/1993 | Kraning et al. |
| 5,218,366 | A | 6/1993 | Cardamone et al. |

(Continued)

FOREIGN PATENT DOCUMENTS

| | | |
|---|---|---|
| WO | 2013059914 A1 | 5/2013 |
| WO | 2013059915 A1 | 5/2013 |
| WO | 2013059917 A1 | 5/2013 |

*Primary Examiner* — Robert Pezzuto
(74) *Attorney, Agent, or Firm* — Bereskin & Parr LLP/S.E.N.C.R.L., s.r.l.

(57) ABSTRACT

A vehicle such as a riding lawn mower may have at least one electric drive motor configured to drive at least one wheel, at least one electric blade motor configured to drive at least one cutting blade, and a battery module connected to the drive and blade motors. According to some embodiments, a method of controlling the vehicle may include: operating the blade motor according to a blade target speed; monitoring a blade current load for the blade motor; comparing the blade current load to a light load low threshold for the blade motor; and if the blade current load is less than the light load low threshold, decreasing the blade target speed.

20 Claims, 5 Drawing Sheets

(56) References Cited

U.S. PATENT DOCUMENTS

| | | | |
|---|---|---|---|
| 5,282,135 | A | 1/1994 | Sato et al. |
| 5,283,740 | A | 2/1994 | Sato et al. |
| 5,311,957 | A | 5/1994 | McLaurin et al. |
| 5,321,582 | A | 6/1994 | Casperson |
| 5,348,502 | A | 9/1994 | Wigram |
| 5,388,176 | A * | 2/1995 | Dykstra et al. ............... 388/811 |
| 5,450,284 | A | 9/1995 | Wekell |
| 5,461,542 | A | 10/1995 | Kosak et al. |
| 5,502,957 | A * | 4/1996 | Robertson ................... 56/11.9 |
| 5,640,304 | A | 6/1997 | Hellinga et al. |
| 5,667,032 | A | 9/1997 | Kamlukin |
| 5,691,957 | A | 11/1997 | Spiesberger |
| 5,761,046 | A | 6/1998 | Hein et al. |
| 5,909,358 | A | 6/1999 | Bradt |
| 5,937,622 | A | 8/1999 | Carrier et al. |
| 5,988,936 | A | 11/1999 | Smith |
| 6,046,908 | A | 4/2000 | Feng |
| 6,078,501 | A | 6/2000 | Catrambone et al. |
| 6,092,355 | A * | 7/2000 | Ishmael ..................... 56/11.9 |
| 6,185,920 | B1 | 2/2001 | Oxley |
| 6,456,925 | B1 | 9/2002 | Romig |
| 6,548,969 | B2 | 4/2003 | Hennings et al. |
| 6,601,663 | B2 | 8/2003 | Hauser |
| 6,675,925 | B2 | 1/2004 | Takahashi et al. |
| 6,691,009 | B1 | 2/2004 | Yao et al. |
| 6,694,239 | B1 | 2/2004 | Yao et al. |
| 6,714,414 | B1 | 3/2004 | Dubovsky et al. |
| 6,721,639 | B2 | 4/2004 | Petrofes et al. |
| 6,736,604 | B2 | 5/2004 | Okada et al. |
| 6,904,985 | B2 | 6/2005 | Ferree et al. |
| 6,948,299 | B2 | 9/2005 | Osborne |
| 7,075,458 | B2 | 7/2006 | Dowdy |
| 7,114,589 | B2 | 10/2006 | Kowatari et al. |
| 7,151,669 | B2 | 12/2006 | Liu |
| 7,190,589 | B2 | 3/2007 | Caines et al. |
| 7,192,040 | B2 | 3/2007 | Xie |
| 7,222,008 | B2 | 5/2007 | Takahashi et al. |
| 7,237,629 | B1 | 7/2007 | Bland et al. |
| 7,237,639 | B2 | 7/2007 | Kowatari et al. |
| 7,275,355 | B2 | 10/2007 | Adams et al. |
| 7,295,907 | B2 | 11/2007 | Lu et al. |
| 7,311,184 | B2 | 12/2007 | Patridge |
| 7,359,203 | B2 | 4/2008 | Chen |
| 7,448,466 | B2 | 11/2008 | Miller et al. |
| 7,487,856 | B2 | 2/2009 | Edson et al. |
| 7,549,243 | B1 | 6/2009 | Gilles |
| 7,594,377 | B1 | 9/2009 | Jansen et al. |
| 7,710,077 | B2 | 5/2010 | Zeng et al. |
| 7,735,845 | B2 | 6/2010 | Snow |
| 7,756,621 | B2 | 7/2010 | Pillar et al. |
| 7,791,888 | B2 | 9/2010 | Tominaga et al. |
| 7,800,395 | B2 | 9/2010 | Johnson et al. |
| 7,866,432 | B2 | 1/2011 | Xie |
| 8,287,323 | B2 | 10/2012 | Hine et al. |
| 8,376,790 | B2 | 2/2013 | Hine et al. |
| 8,620,527 | B2 | 12/2013 | Stone et al. |
| 2003/0070862 | A1 | 4/2003 | Tartara |
| 2006/0175098 | A1 | 8/2006 | Sutherland |
| 2007/0029748 | A1 | 2/2007 | Baxter et al. |
| 2007/0144796 | A1 | 6/2007 | Schaedler et al. |
| 2007/0147004 | A1 | 6/2007 | Caines et al. |
| 2008/0278314 | A1 | 11/2008 | Miller et al. |
| 2010/0045506 | A1 | 2/2010 | Law et al. |
| 2013/0110351 | A1 | 5/2013 | Stone et al. |
| 2013/0234410 | A1 | 9/2013 | Sumihara |
| 2013/0264788 | A1 | 10/2013 | Smyth et al. |

* cited by examiner

METHODS OF CONTROLLING A LAWN MOWER HAVING ELECTRIC DRIVE AND BLADE MOTORS

RELATED APPLICATIONS

This application claims the benefit of U.S. Provisional Patent Application Ser. No. 61/551,895 filed Oct. 26, 2012, the entire contents of which are hereby incorporated by reference herein for all purposes.

TECHNICAL FIELD

The embodiments herein relate to electric riding lawn mowers, and other similar electric vehicles that are self-propelled.

INTRODUCTION

Riding lawn mowers, walk-behind lawn mowers, riding snow blowers, walk-behind snow blowers, riding lawn tractors, and other small vehicles are often powered by electric motors.

In some cases for example, a riding lawn mower may have one or more decks that include one or more cutting blades. The cutting blades may be adapted for cutting vegetation (e.g., grass, weeds, etc.).

SUMMARY OF SOME EMBODIMENTS

According to some embodiments, a method of controlling a lawn mower, the lawn mower having at least one electric drive motor configured to drive at least one wheel, at least one electric blade motor configured to drive at least one cutting blade, and a battery module connected to the drive and blade motors, may comprise: operating the blade motor according to a blade target speed; monitoring a blade current load for the blade motor; comparing the blade current load to a light load low threshold for the blade motor; and if the blade current load is less than the light load low threshold, decreasing the blade target speed.

According to some embodiments, a lawn mower may comprise: a driving assembly comprising at least one electric drive motor and at least one wheel that is driven by the drive motor; a cutting assembly comprising at least one electric blade motor and at least one cutting blade that is driven by the blade motor; a battery module connected to the drive and blade motors; and a controller connected to the drive and blade motors, wherein the controller is configured to: operate the blade motor according to a blade target speed; monitor a blade current load for the blade motor; compare the blade current load to a light load low threshold for the blade motor; and if the blade current load is less than the light load low threshold, decrease the blade target speed.

According to some embodiments, a vehicle may comprise: a driving assembly comprising at least one electric drive motor and at least one wheel that is driven by the drive motor; an implement assembly comprising at least one electric implement motor and at least one implement that is driven by the implement motor; a battery module connected to the drive and implement motors; and a controller connected to the drive and implement motors, wherein the controller is configured to: operate the implement motor according to an implement target speed; monitor an implement current load for the implement motor; compare the implement current load to a light load low threshold for the implement motor; and if the implement current load is less than the light load low threshold, decrease the implement target speed.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION OF VARIOUS EMBODIMENTS

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of those embodiments as described.

Figure 1:
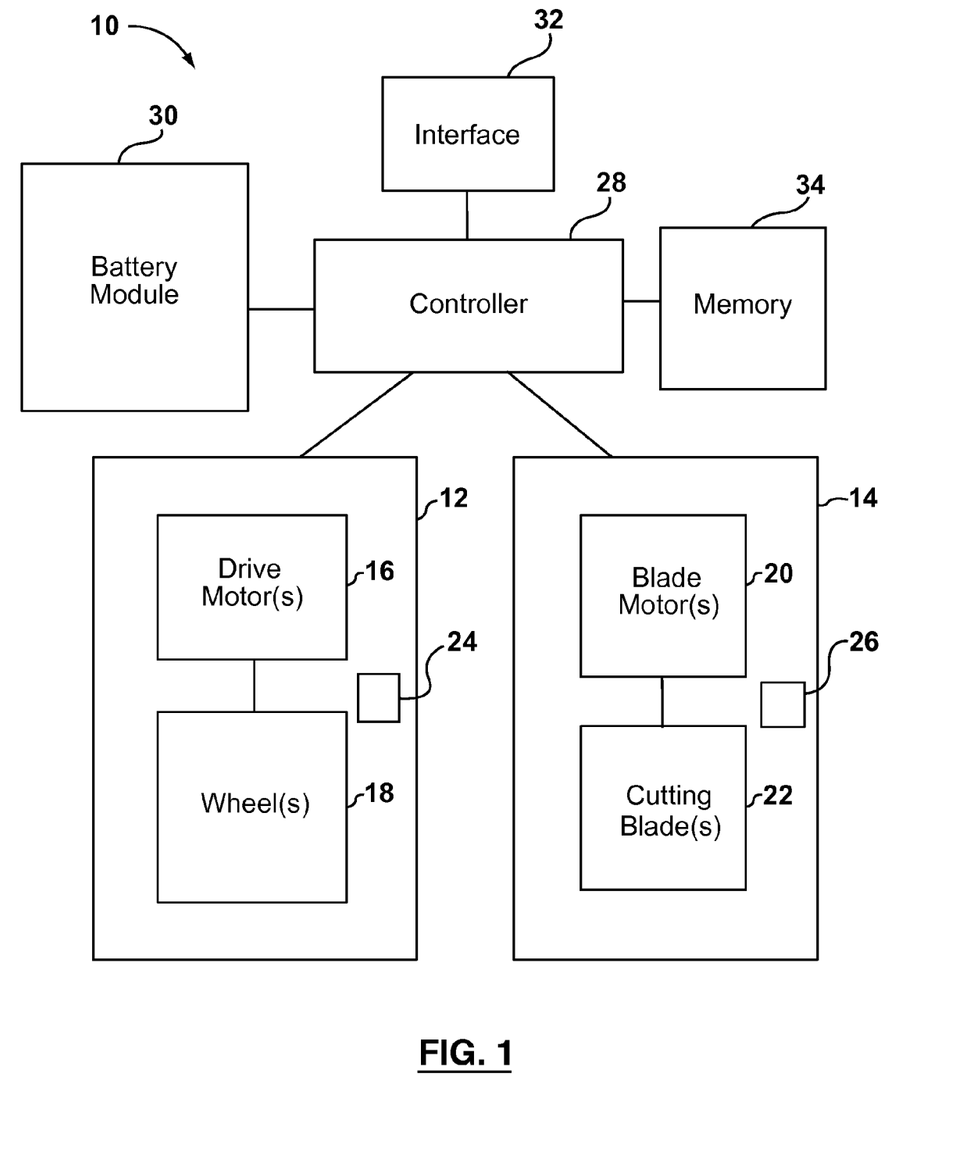
FIG. 1 is a schematic view of an electric vehicle according to some embodiments.

Referring to FIG. 1, an electrically powered vehicle is shown generally at 10. In some embodiments, the vehicle 10 may be an electric riding lawn mower. In other embodiments, the vehicle 10 may be an electric walk-behind lawn mower having self-propulsion, an electric riding snow blower, an electric walk-behind snow blower, or another similar electric vehicle.

As illustrated, the vehicle 10 includes a driving assembly 12. The driving assembly 12 includes at least one electric drive motor 16, and at least one wheel 18 that is driven by the drive motor 16. In some embodiments, the driving assembly 12 may include a shaft, a transmission or gear assembly, and/or other suitable components linking the drive motor 16 and the wheel 18. In other embodiments, the driving assembly 12 may include one or more individual electric hub motors, in which the drive motor 16 and the wheel 18 are integrated as one device.

Although not shown, the driving assembly 12 of the vehicle 10 may also include steering systems for controlling vehicle movement. These systems may operate a set of steerable wheels, for example, the front wheels, rear wheels, or both the front and rear wheels. In particular, these steering systems generally include a steering wheel (not shown) that allows an operator to turn the steering wheel and steer the riding lawn mower by pivoting the steerable wheels.

As illustrated, the vehicle 10 includes a cutting assembly 14. In other embodiments, electric vehicles may include an accessory or implement assembly to carry out a desired function other than cutting. For example, in the case of snow blowers, an impeller or a combination of an auger and an impeller are implements used to clear snow.

The cutting assembly 14 includes at least one electric blade motor 20, and at least one cutting blade 22 that is driven by the blade motor 20. In some embodiments, the cutting blade 22 may be a rotary-type blade configured to rotate about a vertical axis. In other embodiments, the cutting blade 22 may be arranged in a reel assembly that rotates about a horizontal axis.

Although the drive motor 16 and the blade motor 20 are shown and described as separate elements, in other embodiments, a single electric motor may be implemented to deliver mechanical energy to both the wheel 18 and the cutting blade 22. In such embodiments, a transmission or gear assembly (e.g., a continuously variable transmission system) may be used to decouple and distribute mechanical energy between the wheel 18 and the cutting blade 22.

The vehicle 10 also includes a controller 28 that is connected to the driving and cutting assemblies 12, 14. The controller 28 is responsible for delivering current to the motors 16, 20, among other things. In various embodiments, the controller 28 may be implemented on a programmable processing device, such as a microprocessor or microcontroller, Central Processing Unit (CPU), Digital Signal Processor (DSP), Field Programmable Gate Array (FPGA), application-specific integrated circuit (ASIC), and the like.

A load sensor may be arranged within the controller 28 or between the controller 28 and the drive motor 16 to monitor the current load delivered to the drive motor 16. Similarly, a load sensor may be arranged within the controller 28 or between the controller 28 and the blade motor 20 to monitor the current load delivered to the blade motor 20. For example, shunts can be used to monitor the current loads being supplied to the motors 16, 20.

It should be appreciated that two operational characteristics of the vehicle 10 are travel speed and deck or blade speed.

Travel speed refers to the speed that the at least one wheel 18 is being rotated to propel the vehicle 10. Typically, the travel speed may vary between 0, when no current is being directed to the motor 16 and the wheel 18 is motionless, and a full speed in which the vehicle 10 is being propelled along the ground (e.g., in some embodiments up to about 9 mph or even faster).

Deck or blade speed refers to the speed that the at least one cutting blade 22 is operated to cut grass. Typically, the blade speed may fluctuate between 0, when no current is being directed to the motor 20 and the cutting blade 22 is motionless, and a full speed, in which a maximum current load is applied to the motor 20 and the cutting blade 22 is moving at the fastest desirable speed. For safety reasons, the recommended maximum tip speed for a rotary lawn mower blade in some embodiments may be about 19,000 feet per minute. Accordingly, full speed for a 22" rotary blade can be around 3300 rpm, for example.

The driving assembly 12 may further include a sensor 24 configured to monitor the travel speed of the vehicle 10. In some embodiments, the sensor 24 may be an optical sensor arranged adjacent to the wheel 18 and configured to monitor the speed in which the wheel 18 is rotating. In other embodiments, the sensor 24 may be a Hall Effect sensor or other electromechanical sensor arranged to detect rotor position within the motor 16, which information can be correlated to the travel speed.

Similarly, the cutting assembly 14 may further include a sensor 26 configured to monitor a blade speed of the vehicle 10. In some embodiments, the sensor 26 may be an optical sensor arranged adjacent to the cutting blade 22 and configured to monitor the speed in which the cutting blade 22 is rotating. In other embodiments, the sensor 26 may be a Hall Effect sensor or other electromechanical sensor arranged to detect rotor position within the motor 20, which information can be correlated to the blade speed.

The sensors 24, 26 are both connected to the controller 28 to provide travel speed and blade speed information to the controller 28. However, in other embodiments, the sensors 24, 26 may be omitted, and drive and blade speed being monitored based on the current load delivered to the motors 16, 20.

As illustrated, a battery module 30, an interface 32 and a memory 34 are also connected to the controller 28.

The battery module 30 may consist of a single battery, or may include a plurality of separate batteries, connected in series or in parallel to one another. The battery module 30 may be rechargeable, and the controller 28 may be configured to monitor the capacity of the battery module 30 between 100% state of charge and a depleted state.

The interface 32 may include a display for presenting information to the operator, for example, travel speed and blade speed information, state of charge of the battery module 30, and so on. The interface 32 may also include an input device such as a keypad or other control for receiving information from the operator, for example, to establish travel and blade speed setpoints, as described below. In some embodiments, the interface 32 may be a touch screen.

The memory 34 may be configured to store software instructions regarding control of the vehicle 10, and further may be used to store data pertaining to operation of the vehicle 10 (including, for example, speed information from sensors 24, 26, measured on a continuous, periodic and/or intermittent basis). The memory 34 may include non-transitory storage media, both volatile and non-volatile, including but not limited to, random access memory (RAM), dynamic random access memory (DRAM), static random access memory (SRAM), flash memory, magnetic media, and optical media, and other suitable data storage devices.

Capacity of the battery module 30 depends on discharge conditions, such as the magnitude of the current load, the allowable terminal voltage of the battery, temperature, and other factors, all of which may vary over time. The travel speed and the blade speed are factors in determining current drain on the battery module 30. Decreasing the current load on the battery module 30 will increase its useful lifespan, before recharging is necessary. In accordance with some embodiments, the controller 28 is configured to vary the travel speed or the blade speed (or both) based on current load so as to make more effective use of the current load and extend the life of the battery module 30.

Figure 2:
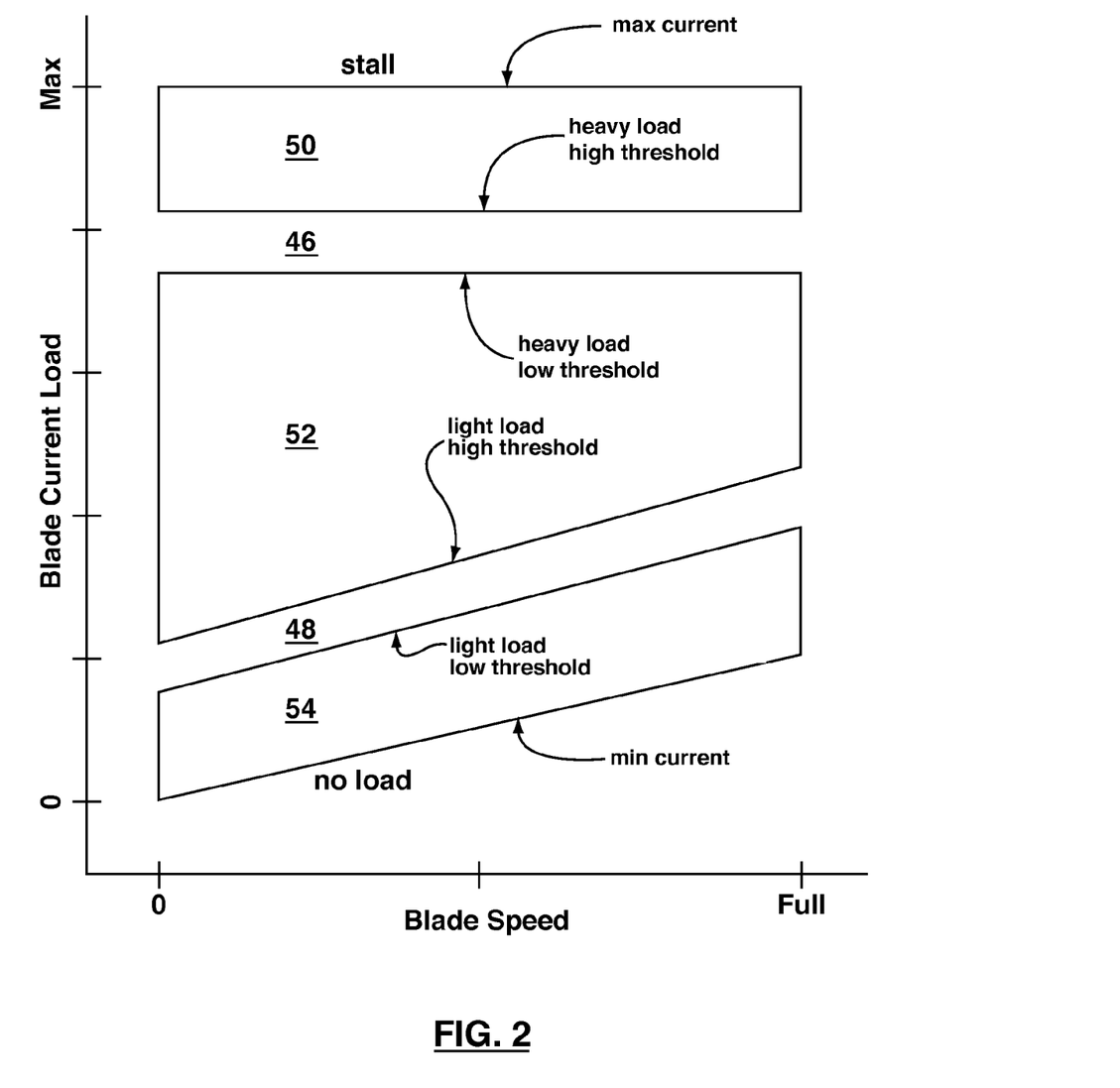
FIG. 2 is a graph illustrating blade speed versus blade current load for the electric vehicle of FIG. 1.

FIG. 2 illustrates the relationship between blade speed and blade current load for the vehicle 10. As illustrated, the blade current load varies from 0 to a maximum current load for the motor 20. The uppermost line represents the maximum current load, which may be set according to the rating of the blade motor 20, and may also be dictated by thermal limitations in either the controller 28 or the motor 20. The maximum current may vary considerably. For example, a maximum current load of 50 A may be appropriate for a relatively small blade, and a maximum current load of up to 200 A or more may be suitable for a relatively heavy blade. Above the maximum current line is the "stall" region.

As illustrated, the blade speed varies from 0 to full speed. Full speed may be set, as mentioned above, according to a tip speed of about 19,000 feet per minute for a rotary blade. The minimum current and light load low and high thresholds are each generally a function of blade speed. Although the line for minimum current load at the bottom edge of the graph is shown to be linear, it should be appreciated that the relationship between blade speed and blade current load may not be exactly linear. Below the minimum current line is the "no load" region.

As illustrated, a light load region 48 is defined by the light load low and high threshold lines, and a heavy load region 46 is defined by heavy load low and high threshold lines. The regions 46, 48 are bounded by active regions 50, 52, 54.

In some embodiments, within the active regions 50, 52, 54 the controller 28 may be configured to alter one or more operational parameters. For example, within the active region 54, the blade speed may be reduced; within the active region 50, the travel speed may be reduced; and within the active region 52, the blade and travel speeds may be increased to a target or setpoint level.

On the other hand, the regions 46, 48 may be deadband regions in which the controller 28 maintains generally the same operational parameters. The regions 46, 48 may avoid short cycling between different modes (for example, speeding up and slowing down of the blade motor 20), which may result in unsteady and generally undesirable motor noise.

The relative positions of each line may vary as desired. As an example, the heavy load high threshold may be set at approximately 80% of the maximum current, in order to define sufficient area within the active region 50 to allow for the correction of the current load before the maximum current line is reached. Similarly, the light load low threshold may be spaced sufficiently from the minimum current line so as to define the size of the active region 54 as a useful buffer. The relative proportions of the regions in FIG. 2 are intended to be illustrative and not limiting.

Figure 3A:
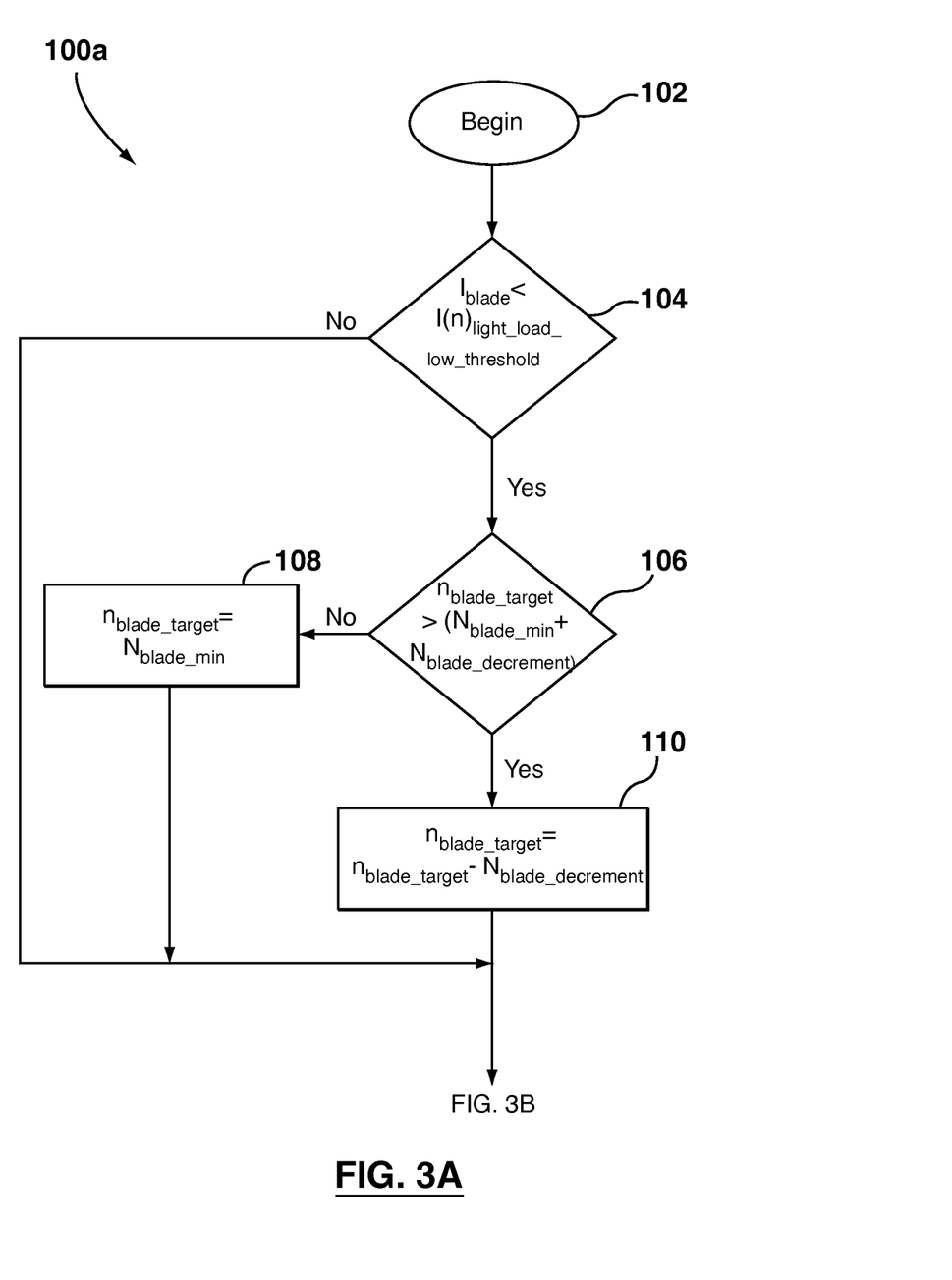
FIGS. 3A, 3B and 3C are flow diagrams illustrating steps of a method of controlling a vehicle according to some embodiments.
Figure 3B:
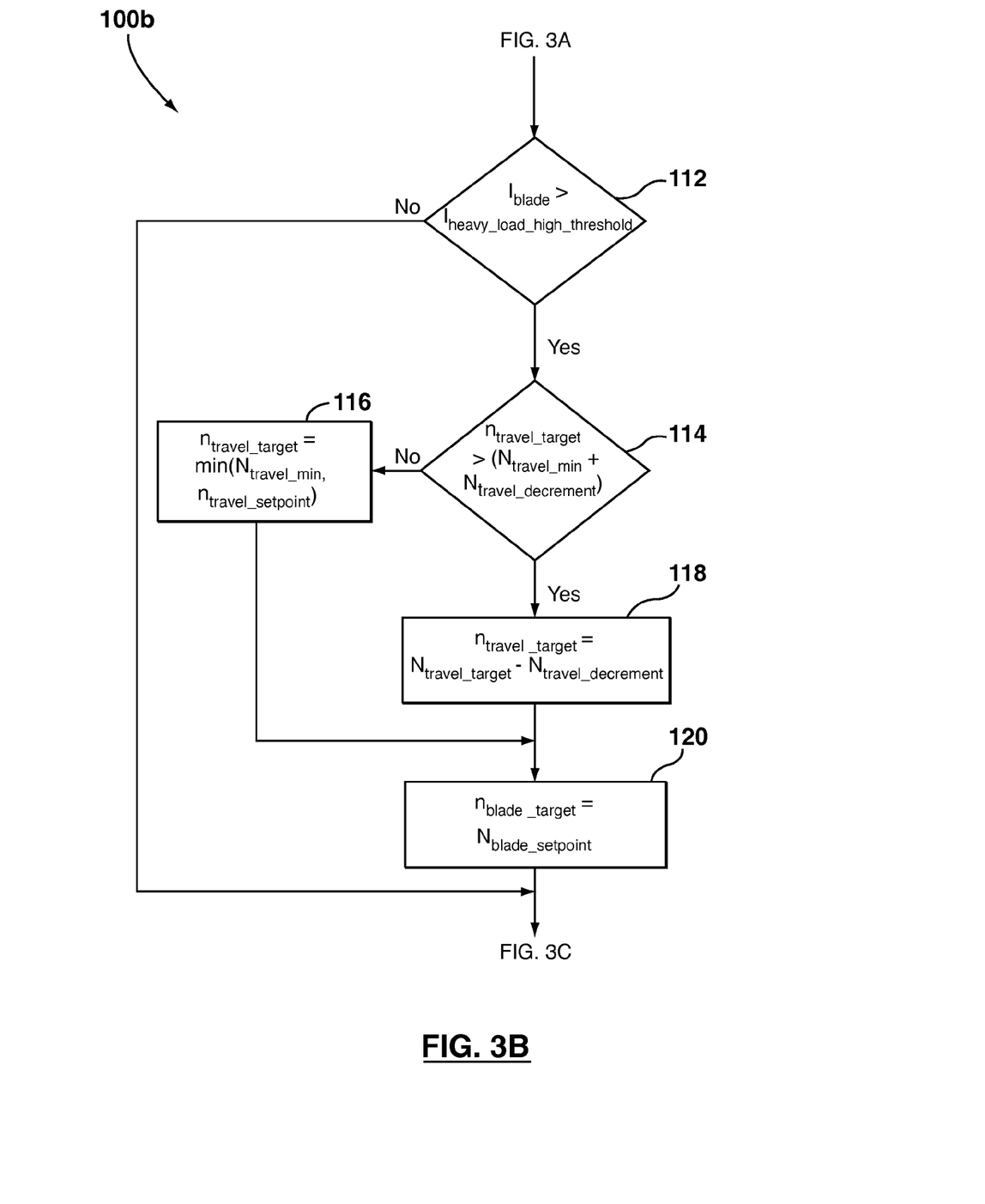
Figure 3C:
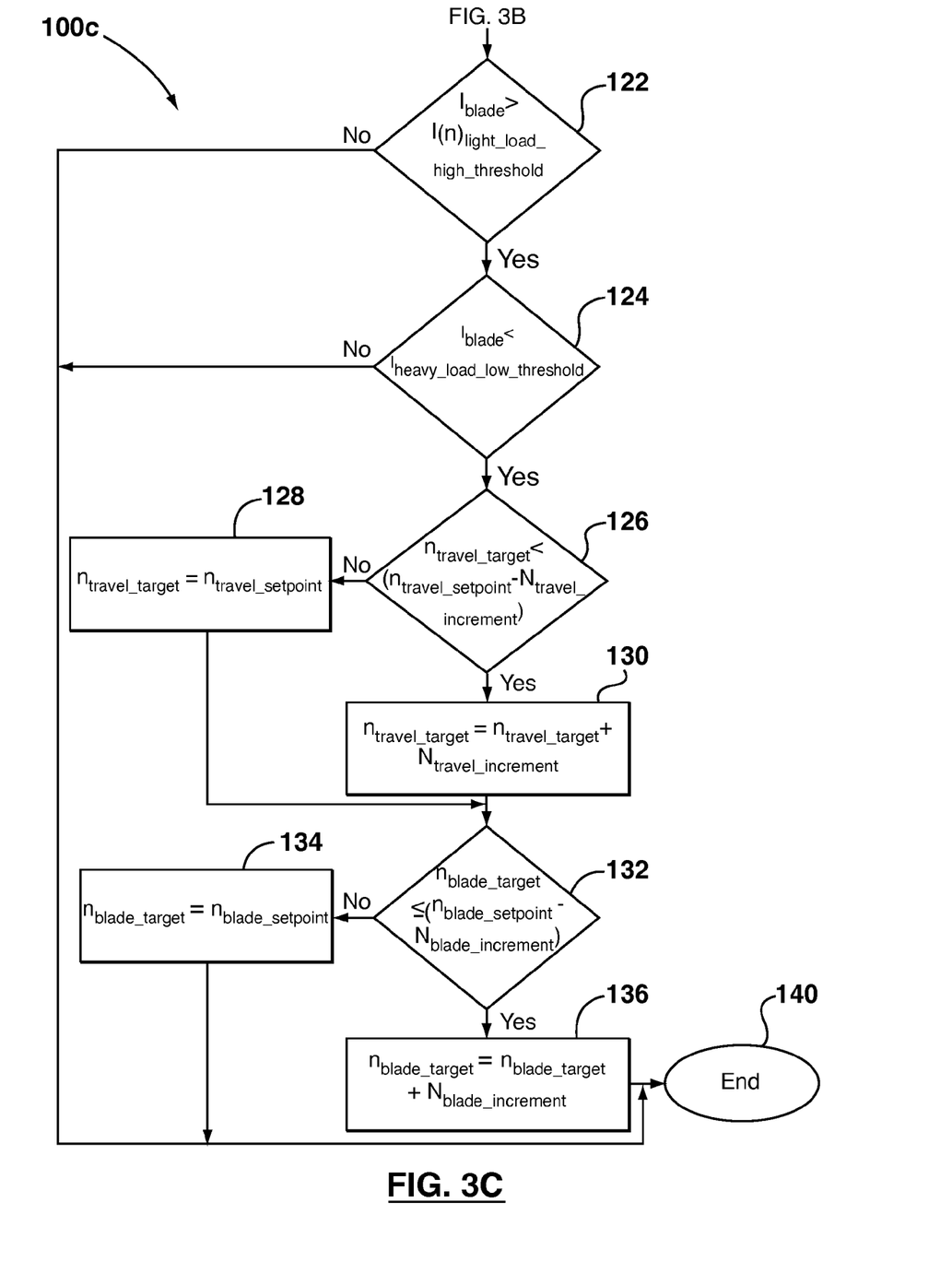

Referring now to FIGS. 3A to 3C, and with continued reference to FIGS. 1 and 2, various steps set out in methods 100a, 100b, 100c may be stored as software instructions on the memory 34, and may be carried out by the controller 28 as a loop on a continuous, periodic and/or intermittent basis. In some embodiments, the loop may be repeated about every 100 ms.

The variables illustrated in FIGS. 3A to 3C are set out in the following table.

| Variable | Description |
| --- | --- |
| $n_{blade\_setpoint}$ | Blade speed setpoint |
| $n_{blade\_target}$ | Blade target speed |
| $n_{travel\_setpoint}$ | Travel speed setpoint |
| $n_{travel\_target}$ | Travel target speed |
| $N_{blade\_min}$ | Blade speed minimum |
| $N_{travel\_min}$ | Travel speed minimum |
| $N_{travel\_decrement}$ | Travel speed decrement step size |
| $N_{travel\_increment}$ | Travel speed increment step size |
| $N_{blade\_decrement}$ | Blade speed decrement step size |
| $N_{blade\_increment}$ | Blade speed increment step size |
| $I_{blade}$ | Actual blade current load |
| $I(n)_{light\_load}$ | Minimum current load |
| $I(n)_{light\_load\_low\_threshold}$ | Light load low threshold current load |
| $I(n)_{light\_load\_high\_threshold}$ | Light load high threshold current load |
| $I_{heavy\_load\_low\_threshold}$ | Heavy load low threshold current load |
| $I_{heavy\_load\_high\_threshold}$ | Heavy load high threshold current load |

Prior to beginning the loop at step 102 in FIG. 3A, a number of parameters may first be established. For example, the target speeds may be the real speed that the controller 28 sets for the motors 16, 20 to achieve, and these may be preprogrammed in the memory 34. Further, the travel and blade speed minimums, and the travel and blade decrement and increment step sizes for decreasing and increasing speeds, respectively, may also be preprogrammed in the memory 34. Moreover, generally as shown in FIG. 2, the minimum current, light load low and high thresholds, and heavy load low and high thresholds, and the maximum current values may be preprogrammed in the memory 34. On the other hand, the setpoints may be the values that the operator sets for a desired travel or deck speed the blade and travel speed. The setpoints may be established by the operator, for example, through the interface 32, and these may change over time depending on the particular cutting conditions encountered by the operator and perceived performance of the vehicle 10.

Method 100a in FIG. 3A corresponds generally to active region 54 in FIG. 2. Referring to FIG. 3A, the loop begins at step 102. At step 104 the blade current load (which is being monitored by the controller 28) is compared to the light load low threshold. If the blade current load is less than the light load low threshold, then the blade speed target is set to either a blade speed minimum (steps 106, 108), or the blade speed target minus a blade speed decrement step size (steps 106, 110). Accordingly, within the active region 54, the controller 28 is configured to reduce the blade speed if there is a light load on the cutting blade 22, thereby to reduce current load and extend life of the battery module 30.

Method 100b in FIG. 3B corresponds generally to active region 50 in FIG. 2. Referring to step 112 of FIG. 3B, the blade current load is compared to the heavy load high threshold. If the blade current load is greater than the heavy load high threshold, then the travel target speed is set to either a travel speed minimum setpoint (steps 114, 116), or the target speed minus a travel speed decrement step size (steps 114, 118). At step 120, the blade target speed is reset to the blade setpoint. Accordingly, within the active region 50, the controller 28 is configured to reduce the travel speed if the cutting blade 22 under heavy load, thereby to reduce current load and extend life of the battery module 30.

Method 100c in FIG. 3C corresponds generally to active region 52 in FIG. 2. Referring to FIG. 3C, at step 122, the blade current load is compared to the light load high threshold and the heavy load low threshold. If the blade current load is greater than the light load high threshold and less than the heavy load low threshold, then, firstly, the travel target speed is set to either a travel speed setpoint (steps 126, 128), or the travel speed target plus a travel speed increment step size (steps 126, 130). Secondly, the blade speed target is set either to the blade speed setpoint (steps 132, 134), of the blade target speed plus a blade speed increment step size (steps 132, 136). Accordingly, within the active region 52, the controller 28 is configured to restore the travel and blade speeds, thereby to make effective use of current from the battery module 30. The loop terminates at step 140.

While the above description provides examples of one or more apparatus, methods, or systems, it will be appreciated that other apparatus, methods, or systems may be within the scope of the present description as interpreted by one of skill in the art.

The invention claimed is:

1. A method of controlling a lawn mower, the lawn mower having at least one electric drive motor configured to drive at least one wheel, at least one electric blade motor configured to drive at least one cutting blade, and a battery module connected to the drive and blade motors, the method comprising:
    operating the blade motor according to a blade target speed;
    monitoring a blade current load for the blade motor;
    comparing the blade current load to a light load low threshold for the blade motor; and if the blade current load is less than the light load low threshold, decreasing the blade target speed.

2. The method of claim 1, further comprising:
receiving a blade speed setpoint; and
setting the blade target speed based at least partially on the blade speed setpoint.

3. The method of claim 1, further comprising:
operating the drive motor according to a travel target speed;
comparing the blade current load to a heavy load high threshold for the blade motor; and
if the blade current load is greater than the heavy load high threshold, decreasing the travel target speed.

4. The method of claim 3, further comprising:
receiving a travel speed setpoint; and
setting the travel target speed based at least partially on the travel speed setpoint.

5. The method of claim 3, further comprising:
receiving a blade speed setpoint; and
setting the blade target speed based at least partially on the blade speed setpoint.

6. The method of claim 1, further comprising:
operating the drive motor according to a travel target speed;
comparing the blade current load to a light load high threshold and a heavy load low threshold for the blade motor; and
if the blade current load is greater than the light load high threshold and less than the heavy load low threshold, increasing the travel target speed.

7. The method of claim 6, further comprising:
receiving a travel speed setpoint; and
setting the travel target speed based at least partially on the travel speed setpoint.

8. The method of claim 6, further comprising:
if the blade current load is greater than the light load high threshold and less than the heavy load low threshold, increasing the blade target speed.

9. The method of claim 8, further comprising:
receiving a blade speed setpoint; and
setting the blade target speed based on the blade speed setpoint.

10. A lawn mower, comprising:
a driving assembly comprising at least one electric drive motor and at least one wheel that is driven by the drive motor;
a cutting assembly comprising at least one electric blade motor and at least one cutting blade that is driven by the blade motor;
a battery module connected to the drive and blade motors; and
a controller connected to the drive and blade motors, wherein the controller is configured to:
operate the blade motor according to a blade target speed;
monitor a blade current load for the blade motor;
compare the blade current load to a light load low threshold for the blade motor; and
if the blade current load is less than the light load low threshold, decrease the blade target speed.

11. The lawn mower of claim 10, wherein the controller is further configured to:
receive a blade speed setpoint; and
set the blade target speed based at least partially on the blade speed setpoint.

12. The lawn mower of claim 10, wherein the controller is further configured to:
operate the drive motor according to a travel target speed;
compare the blade current load to a heavy load high threshold for the blade motor; and
if the blade current load is greater than the heavy load high threshold, decrease the travel target speed.

13. The lawn mower of claim 12, wherein the controller is further configured to:
receive a travel speed setpoint; and
set the travel target speed based at least partially on the travel speed setpoint.

14. The lawn mower of claim 12, wherein the controller is further configured to:
receive a blade speed setpoint; and
set the blade target speed based at least partially on the blade speed setpoint.

15. The lawn mower of claim 10, wherein the controller is further configured to:
operate the drive motor according to a travel target speed;
compare the blade current load to a light load high threshold and a heavy load low threshold for the blade motor; and
if the blade current load is greater than the light load high threshold and less than the heavy load low threshold, increase the travel target speed.

16. The lawn mower of claim 15, wherein the controller is further configured to:
receive a travel speed setpoint; and
set the travel target speed based at least partially on the travel speed setpoint.

17. The lawn mower of claim 15, wherein the controller is further configured to:
if the blade current load is greater than the light load high threshold and less than the heavy load low threshold, increase the blade target speed.

18. The lawn mower of claim 17, wherein the controller is further configured to:
receive a blade speed setpoint; and
set the blade target speed based on the blade speed setpoint.

19. A vehicle, comprising:
a driving assembly comprising at least one electric drive motor and at least one wheel that is driven by the drive motor;
an implement assembly comprising at least one electric implement motor and at least one implement that is driven by the implement motor;
a battery module connected to the drive and implement motors; and
a controller connected to the drive and implement motors, wherein the controller is configured to:
operate the implement motor according to an implement target speed;
monitor an implement current load for the implement motor;
compare the implement current load to a light load low threshold for the implement motor; and
if the implement current load is less than the light load low threshold, decrease the implement target speed.

20. The vehicle of claim 19, wherein the controller is further configured to:
operate the drive motor according to a travel target speed;
compare the implement current load to a heavy load high threshold for the implement motor; and
if the implement current load is greater than the heavy load high threshold, decrease the travel target speed.

* * * * *